United States Patent

[11] 3,590,771

| [72] | Inventor | James J. Lutsch |
| | | Glenview, Ill. |
| [21] | Appl. No. | 50,269 |
| [22] | Filed | June 26, 1970 |
| [45] | Patented | July 6, 1971 |
| [73] | Assignee | Bell & Howell Company |
| | | Chicago, Ill. |

[54] SCENE FINDER FOR PROJECTOR CARTRIDGE
5 Claims, 3 Drawing Figs.

[52] U.S. Cl. .................................................. 116/114 J,
116/67 A, 206/52 R, 242/71.8, 274/4 B, 352/170
[51] Int. Cl. ......................................................... G01b 21/00
[50] Field of Search ...................................... 116/67 A,
114, 114 J, 129 L; 352/72, 73, 74, 170, 171, 172;
206/52; 274/4 C, 4 B; 242/71.1, 71.2, 71.8 A,
55.19 A; 240/1 EI

[56] References Cited
UNITED STATES PATENTS

| 2,475,898 | 7/1949 | Jacobson | 352/172 |
| 2,802,290 | 8/1957 | Carey | 116/114 UX |
| 2,829,618 | 4/1958 | Ostergard | 116/114 |
| 2,974,892 | 3/1961 | Geloso | 242/71.8 A |
| 3,097,810 | 7/1963 | Kerney | 242/71.8 A |
| 3,115,242 | 12/1963 | Kolesh | 206/52 |
| 3,407,781 | 10/1968 | Ardire et al | 116/114 |
| 3,537,779 | 11/1970 | Horvath | 352/78 |

FOREIGN PATENTS

| 218,586 | 8/1958 | Australia | 352/170 |
| 297,073 | 5/1954 | Switzerland | 274/4 C |

Primary Examiner—Louis J. Capozi
Attorneys—William F. Pinsak, John E. Peele, Jr., Kenneth W. Greb and William K. Serp

ABSTRACT: A cartridge adapted for mounting on a projector encloses a rotatably mounted reel on which film is wound. A light source, which is preferably mounted in the projector frame, registers with an opening in one edge of the cartridge to light the space within the cartridge between the peripheral surface of a portion of the film wound on tee reel and the adjacent walls of the cartridge. One face of the cartridge is provided with a radially disposed slot having its outer end adjacent the light source. A transparent or translucent indicator scale is mounted on one face of the cartridge in position to cover the slot so that the portion of the indicator scale extending radially beyond the outer perimeter of the film wound on the reel is illuminated by the light within the cartridge. An index covering part of the one face of the cartridge, but having an opening through which the indicator scale is exposed comprises parallel lines intersecting various indicia on said scale, whereby scene sequences identified by short descriptions entered on said lines are keyed directly to specific indicia on the scale.

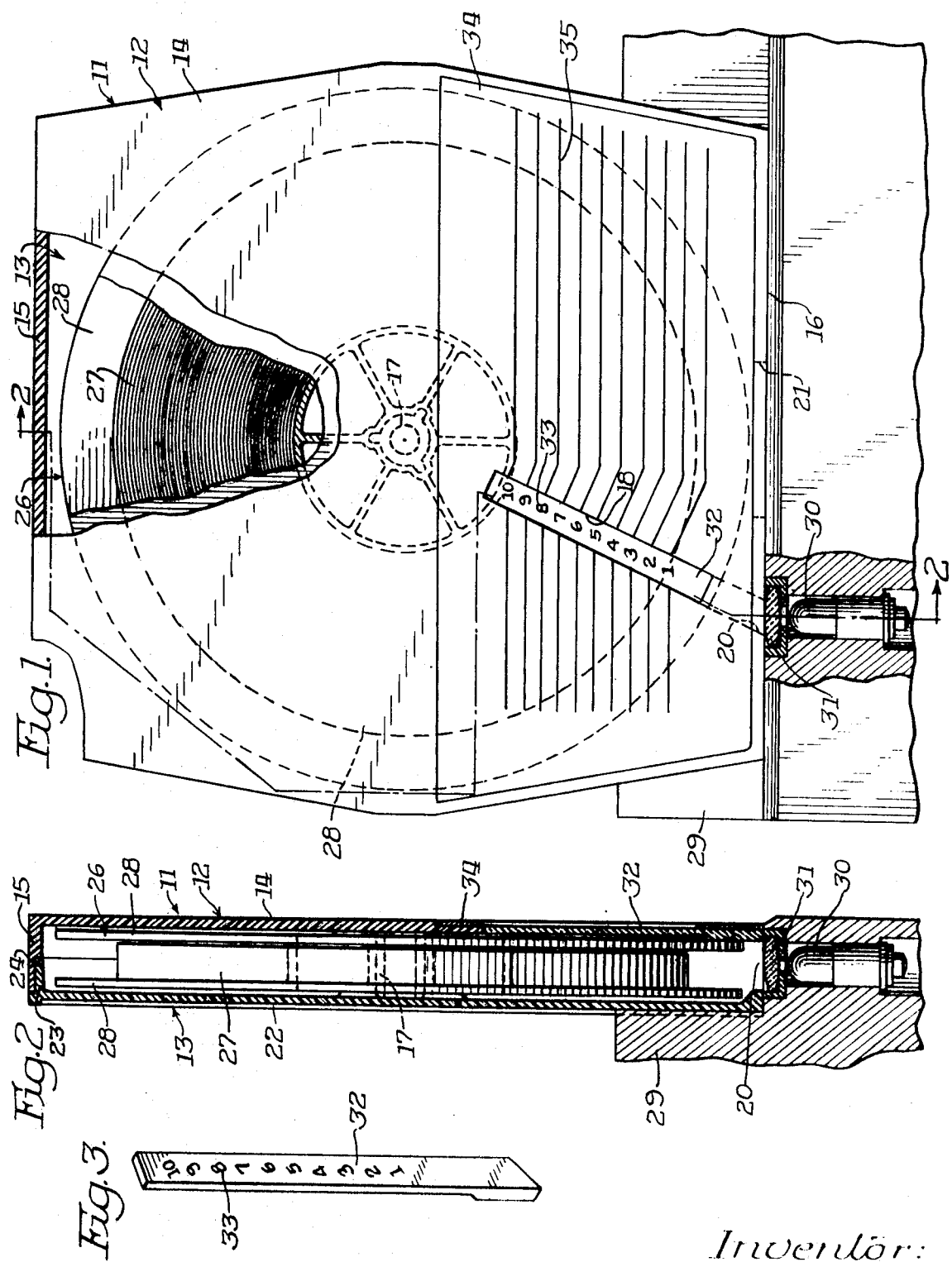

SCENE FINDER FOR PROJECTOR CARTRIDGE

This invention relates to a scene finder for projector cartridges, and is particularly concerned with simple inexpensive means for indicating the amount of film would on a reel that is rotatably contained in the cartridge, and means for indexing descriptions of scenes in various portions of the film to facilitate finding individual scenes on a film concealed within the cartridge.

It has been known previously to provide a film-holding reel with an indicator scale so that the amount of film left on the reel could be determined by visual observation of the outer perimeter of the film through the transparent flange of the reel, as disclosed in the patent to Kerney, U.S. Pat. No. 3,097,810. However, it is difficult to read the indicator scale when the reel is mounted on a projector, and it is virtually impossible to read the scale if the reel is enclosed in a cartridge, even if the cartridge is made of clear transparent plastic.

In accordance with the present invention, an indicator scale is mounted on the cartridge, and the space within the cartridge in proximity to the indicator scale is illuminated to facilitate determination of the position of the outer perimeter of the film relative to the indicia on the scale when the cartridge enclosing the film-holding reel is mounted on a projector. An index on one face of the cartridge comprises a plurality of parallel lines intersecting the indicia on the scale, whereby specific scenes may be identified by the entry of a short description of the scene on the line intersecting the scale at a point indicating the location of the specific scene when the film is wound on the reel.

Suitable structure by means of which the above-noted and other advantages of the invention are attained will be fully described in the following specification taken in conjunction with the accompanying drawings showing a preferred embodiment of the invention.

In the drawings:

FIG. 1 is a side elevational view of a cartridge mounted on a frame of a projector, with parts of the structure cut away to facilitate illustration of the invention;

FIG. 2 is a cross-sectional view, taken along the line 2-2 of FIG. 1; and

FIG. 3 is a detail perspective view of the indicator scale.

Referring to the drawings, the cartridge 11 comprises two mating sections 12 and 13 of any suitable material. The mating sections 12 and 13 are preferably molded as integral units of transparent or translucent plastic material and are shaped to form a cartridge of any desired configuration. The section 12 comprises a flat face 14 and a rim 15 extending at right angles along most of its edges except its bottom edge 16. A centrally disposed cylindrical post 17 extends at right angles from the inner surface of the flat face 14 for a purpose hereinafter disclosed. If desired, the post 17 may be mounted in the section 13 instead of the section 12, as described. The post 17 is preferably hollow and has a length substantially equal to the height of the rim 15.

The flat face 14 has a radially disposed slot 18 extending from the bottom edge 16 and terminating near the center of the cartridge, but short of the post 17. The slot 18 extends through the thickness of the flat face 14. The bottom edge 16 has a partial rim (not shown), similar to the rim 15 except that it has an opening 20 aligned with the outer end of the slot 18 and another opening 21 through which film may be fed to and from the cartridge.

The section 13 comprises a flat face 22 having a rim 23 frictionally fitting within the rim 15 and abutting an internal shoulder 24 extending substantially along the entire length of the rim 15.

A reel 26, upon which a length of motion-picture film 27 is wound between a pair of flanges 28, may be rotatably supported about the post 17 before the sections 12 and 13 are snapped together. Except that flanges 28 of reel 26 are transparent, the reel is conventional, and its structure does not require description. As the film is unwound from or wound onto the reel, it passes through the opening 21 to the projector.

The cartridge 11 is mounted on the frame 29 of a motion-picture projector with its bottom edge 16 engaging the support surface of the frame and with the opening 20 in registration with a light source 30. The light source is preferably located to provide light adjacent the opening 20, which light may be furnished by a light bulb, or may be piped from the projection lamp. A lens 31 is mounted in the frame 29 adjacent the opening 20 to direct the light from the light source 30 into the space within the cartridge between the outer surface of the film wound on the reel and the walls of the cartridge in proximity to an indicator scale 32.

The indicator scale 32 is secured in any suitable manner to the face 14 is position to cover the radially disposed slot 18. The indicator scale is preferably the same size as the slot 18, and is secured to the face 14 by fitting in into the slot and cementing its edges to the edges of the face 14 defining the slot. The indicator scale comprises a bar of transparent or translucent material preferably plastic, having thereon suitable indicia 33 spaced along its length. The indicia is preferably formed in the surface of the scale to provide optimum visibility of all indicia when the scale is illuminated. Light from source 30 shines into the space within the cartridge onto the end portion of the indicator scale, and onto the outer film convolution about the reel hub. Since the film when wrapped is opaque to light, the open area of the space within the cartridge shows bright relative to the film. That is, the film appears as a shadow movable along the scale relative to the indicia thereon. At any instant, whether the reel is stationary or rotating, the effective length of film in the cartridge can be read.

The flat face 14 of the section 12 is preferably provided with an index 34 comprising a plurality of parallel lines 35. The lines 35 are spaced apart a distance equal to the spacing between the indicia 33 and located to intersect said indicia. The lines 35 may be formed into the outer surface of the face 14, or may be printed on a label secured to said face by suitable adhesive. If the lines are formed into the surface of the face 14, the area surrounding them is treated to receive writing. If a printed label is used, it is provided with an opening through which the indicia on the scale may be viewed. The label may overlay the outer end portion of the indicator scale and help hold it in place if it is not cemented in the face 14. A short description, identifying a specific scene depicted on the film, can be written on the particular line 35 that intersects the indicia that designates the location of the specific scene on the film. For example, if the specific scene that is to be shown is described on the line intersecting the numeral "5" of the indicia 33, the film on the reel 26 is unwound until the edge of the lighted area within the cartridge 11 reaches the numeral "5."

Although a preferred embodiment of the invention has been described in considerable detail, it will be understood that many of the details may be modified or changed without departing from the spirit or scope of the invention.

What I claim is:

1. A cartridge adapted for mounting on a projector and enclosing a rotatably mounted reel on which film is wound, a translucent indicator scale forming a portion one face of said cartridge extending from the axis and at least to the perimeter of said reel and illuminating means for directing light supported on said projector substantially longitudinally along said indicator scale and directing light onto the outer perimeter of the film would on said reel, said light illuminating the portion of said indicator scale extending radially beyond the outer perimeter of the film.

2. A cartridge as recited in claim 1, in which said illuminating means is mounted in said projector in such position that the outer end of said indicator scale is adjacent one end of said illuminating means when said cartridge is mounted on said projector.

3. A cartridge as recited in claim 1 and having a marked area on said face thereof for receiving short descriptive identifications of various scenes depicted on the film within said cartridge.

4. A cartridge as recited in claim 3 and having a label secured to said face, said marked area being located on said label, and said label overlying the outer end of said indicator scale.

5. A cartridge as recited in claim 3, in which said marked area is divided by parallel lines intersecting indicia on said indicator scale, whereby various scenes on said film are keyed directly to specific indicia on said indicator scale.

UNITED STATES PATENT OFFICE

PO 1050
(5/69)

CERTIFICATE OF CORRECTION

Patent No. 3,590,771     Dated July 6, 1971

Inventor(s) James J. Lutsch

It is certified that error appears in the above-identified patent and that said Letters Patent are hereby corrected as shown below:

Claim 1 should read:

1. A cartridge adapted for mounting on a projector and enclosing a rotatably mounted reel on which film is wound, a translucent indicator scale forming a portion of one face of said cartridge extending radially from the axis and at least to the perimeter of said reel, and illuminating means supported on said projector for directing light substantially longitudinally along said indicator scale and directing light onto the outer perimeter of the film wound on said reel, said light illuminating the portion of said indicator scale extending radially beyond the outer perimeter of the film.

Signed and sealed this 22nd day of February 1972.

(SEAL)
Attest:

EDWARD M. FLETCHER, JR.
Attesting Officer

ROBERT GOTTSCHALK
Commissioner of Patents